United States Patent

Tang

(10) Patent No.: US 9,742,947 B2
(45) Date of Patent: Aug. 22, 2017

(54) IMAGE READING APPARATUS

(71) Applicant: Ming Tang, Osaka (JP)

(72) Inventor: Ming Tang, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 44 days.

(21) Appl. No.: 13/662,205

(22) Filed: Oct. 26, 2012

(65) Prior Publication Data

US 2013/0107332 A1    May 2, 2013

(30) Foreign Application Priority Data

Nov. 1, 2011    (JP) ................................. 2011-240035

(51) Int. Cl.
| | |
|---|---|
| *H04N 1/04* | (2006.01) |
| *H04N 1/00* | (2006.01) |
| *H04N 1/193* | (2006.01) |
| *H04N 1/028* | (2006.01) |
| *H04N 1/10* | (2006.01) |
| *H04N 1/12* | (2006.01) |

(52) U.S. Cl.
CPC ..... *H04N 1/00909* (2013.01); *H04N 1/00981* (2013.01); *H04N 1/02865* (2013.01); *H04N 1/1013* (2013.01); *H04N 1/1235* (2013.01); *H04N 1/193* (2013.01); *H04N 2201/0094* (2013.01)

(58) Field of Classification Search
CPC ............... H04N 1/00909; H04N 1/193; H04N 1/00981; H04N 1/02865

USPC .......................... 358/483, 474, 475, 497, 471
See application file for complete search history.

(56) References Cited

U.S. PATENT DOCUMENTS

| | | | |
|---|---|---|---|
| 5,138,375 A * | 8/1992 | Iimori .............................. 399/92 |
| 5,546,139 A * | 8/1996 | Bacs et al. ..................... 348/754 |
| 5,860,042 A | 1/1999 | Tomaru et al. | |
| 7,095,535 B2 * | 8/2006 | Ogata ........................... 358/475 |
| 7,256,914 B1 * | 8/2007 | Chen .................. H04N 1/00989 358/474 |
| 8,228,571 B2 * | 7/2012 | Beegle et al. ................ 358/497 |
| 2006/0203306 A1 * | 9/2006 | Hoshi ................ H04N 1/00002 358/497 |

FOREIGN PATENT DOCUMENTS

| | | | | |
|---|---|---|---|---|
| JP | 63-172560 A | | 7/1988 | |
| JP | 02-293730 | * | 12/1990 | ............... H04N 1/04 |
| JP | 4-65335 A | | 6/1992 | |

(Continued)

*Primary Examiner* — Houshang Safaipour
(74) *Attorney, Agent, or Firm* — Birch, Stewart, Kolasch & Birch, LLP

(57) ABSTRACT

An image reading apparatus includes an LED light source, a CCD sensor receiving light reflected from a document irradiated with light from the LED light source, a fan, and a frame housing the LED light source, the CCD sensor and the fan. The fan circulates air in a substantially sealed space formed by the frame. Thus, temperature difference in the image reading apparatus can be reduced while not degrading dust-proof property of the apparatus, and efficient heat radiation to the outside becomes possible. Thus, variation of sensitivity of CCD sensor, deviation of point of focus of image forming system and deviation of reading position caused by temperature increase can be prevented.

7 Claims, 6 Drawing Sheets

(56) References Cited

FOREIGN PATENT DOCUMENTS

| JP | 8-102822 A | 4/1996 |
|---|---|---|
| JP | 2002-203426 A | 7/2002 |
| JP | 2002-354212 A | 12/2002 |
| JP | 2007-114265 A | 5/2007 |
| JP | 2008-160577 A | 7/2008 |
| JP | 2009-49788 A | 3/2009 |

* cited by examiner

IMAGE READING APPARATUS

CROSS-REFERENCE TO RELATED APPLICATIONS

This nonprovisional application claims priority under 35 U.S.C. §119(a) on Patent Application No. 2011-240035 filed in Japan on Nov. 1, 2011, the entire contents of which are hereby incorporated by reference.

BACKGROUND OF THE INVENTION

Field of the Invention

The present invention relates to an image reading apparatus capable of preventing temperature increase of a light source for irradiating a document with light and of a reading sensor.

Description of the Background Art

Generally, in an image reading apparatus, a document surface is irradiated with light emitted from a light source, the light reflected from the document surface is directed to an image pick-up surface of a reading sensor using an optical system including a lens or the like to form an image, and thereby, an image on the document is read.

In such an image reading apparatus, the light source is kept on during an image reading period. Therefore, during the image reading period, the light source generates heat and its temperature increases. Typically, the light source and the reading sensor are placed in an enclosure for preventing entrance of dust and, therefore, temperature in the enclosure of image reading apparatus tends to increase because of heat generated by the light source and, naturally, the temperature of reading sensor also increases.

As the reading sensor, a CCD (Charge Coupled Device) image sensor is generally used. In the image reading period, when a sensor driving circuit driving the CCD image sensor enters an operating state, clocks are supplied from the sensor driving circuit to the CCD image sensor. Therefore, in the image reading period, the temperature is higher than in a standby state, because of self-heating of the reading sensor.

When the temperature of reading sensor increases, sensitivity of the reading sensor may vary, or members forming the reading sensor may deform because of thermal expansion, possibly causing problems such as deviation of a point of focus of the image forming system, or deviation of reading position. Therefore, conventionally, a cooling mechanism has been provided in the enclosure of image reading apparatus, and the light source lamp for the document and the reading sensor are cooled only during the reading period. By way of example, Japanese Patent Laying-Open No. 8-102822 (hereinafter referred to as '822 Reference) discloses a technique of arranging a cooling fan on a wall surface of an enclosure, and by introducing external air from the outside into the enclosure, cooling the light source lamp for the document and the reading sensor. By such an approach, during the image reading period, temperatures of various members including the reading sensor are maintained close to a prescribed temperature.

As described above, a reading unit for reading a document is in most cases formed to have a sealed structure to prevent entrance of paper powder or dust, and to prevent any foreign material from adhering to optical components and the like arranged therein. With the reading unit having such a sealed structure, the temperature of light source and its vicinity in the reading unit attains very high. If an opening is provided at the reading unit to prevent temperature increase, however, there arises a problem that inside of the scanner (image reading apparatus) is contaminated by dust or foreign matters. The problem of scanner contamination is similarly experienced if the external air is introduced to the inside of enclosure to cool the light source lamp for the document and the reading sensor, as in '822 Reference.

It may be possible to provide a fan on a wall surface of a scanner frame, to discharge air that is heated to a high temperature in the scanner. The scanner unit, however, is substantially sealed and, hence, it is difficult to efficiently discharge high-temperature air in the scanner. Therefore, sufficient cooling effect cannot be attained. If an external air inlet is provided, the efficiency of discharge can be increased, whereas dust-proof property degrades.

SUMMARY OF THE INVENTION

In view of the problems above, it is desirable to provide an image reading apparatus capable of efficiently preventing temperature increase of the light source for irradiating a document surface and the reading sensor, while maintaining dust-proof property.

According to an aspect, the present invention provides an image reading apparatus, including: a light emitting unit emitting light; a light receiving unit receiving light reflected from a document irradiated with light from the light emitting unit; an air blower unit blowing out sucked air to one direction; and a housing unit housing the light emitting unit, the light receiving unit and the air blower unit; and the air blower unit circulates air in a space formed by the housing unit.

Preferably, the housing unit forms a substantially sealed space preventing entrance of air from the outside as the air blower unit blows air.

More preferably, the air blower unit is arranged close to the light receiving unit.

More preferably, the housing unit has a rectangular parallelepiped shape having an upper surface, a lower surface opposite to the upper surface and four side surfaces; the air blower unit is arranged between the light receiving unit and one of the side surfaces of the housing unit; and air blowing direction of the air blower unit is along the side surface opposite to the light receiving unit with the air blower unit positioned in between.

Preferably, the image reading apparatus further includes a temperature detecting unit for detecting temperature of at least one of the light receiving unit and the light emitting unit; and the air blower unit blows air if a value detected by the temperature detecting unit is larger than a prescribed value, and stops air blow if the value detected by the temperature detecting unit is equal to or smaller than the prescribed value.

More preferably, the air blower unit blows air if the light emitting unit is emitting light, and stops air blow if the light emitting unit is not emitting light.

More preferably, the air blower unit increases air flow rate as resolution of scanning a document by the light receiving unit becomes higher.

Preferably, the image reading apparatus further includes a timer detecting passage of time, and the air blower unit starts blowing air if it is detected by the timer that a prescribed time has passed from start of light emission with the light emitting unit fixed in one job.

By the present invention, air is circulated in the image reading apparatus, so that temperature difference inside the image reading apparatus can be reduced, and heat can be dissipated efficiently to the outside. As a result, variation in sensitivity of the reading sensor (light receiving unit) can be prevented. Further, deviation of a point of focus of the image forming system, or deviation of reading position, caused by thermal expansion of members forming the reading sensor, can be prevented.

Further, the housing unit forms a substantially sealed space and, therefore, dust-proof property of the image reading apparatus is not degraded.

Further, since the air blower unit (fan) is arranged near the light receiving unit, temperature increase at the light receiving unit can more efficiently be prevented.

Further, the blowing direction of the air blower unit (fan) is set to be along the sidewall of housing unit (frame) and, hence, more efficient heat radiation to the outside can be realized.

Further, air is blown when the temperature of at least one of the light receiving unit and the light emitting unit exceeds a prescribed temperature and, hence, temperature increase of the light emitting unit and of the light receiving unit can more efficiently be prevented, and power consumption resulting from unnecessary blowing can be prevented.

Further, by increasing the amount of blown air as the resolution of document scanning becomes higher, temperature increase of the light emitting unit and of the light receiving unit can more efficiently be prevented, and power consumption resulting from unnecessary blowing can be prevented.

Further, by blowing air only while the light emitting unit is emitting light, temperature increase of the light emitting unit and of the light receiving unit can more efficiently be prevented, and power consumption resulting from unnecessary blowing can be prevented.

Further, when a plurality of documents are to be scanned in one job, by starting blowing after a prescribed time from the start of light emission by the light emitting unit, temperature increase of the light emitting unit and of the light receiving unit can more efficiently be prevented, and power consumption resulting from unnecessary blowing can be prevented.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
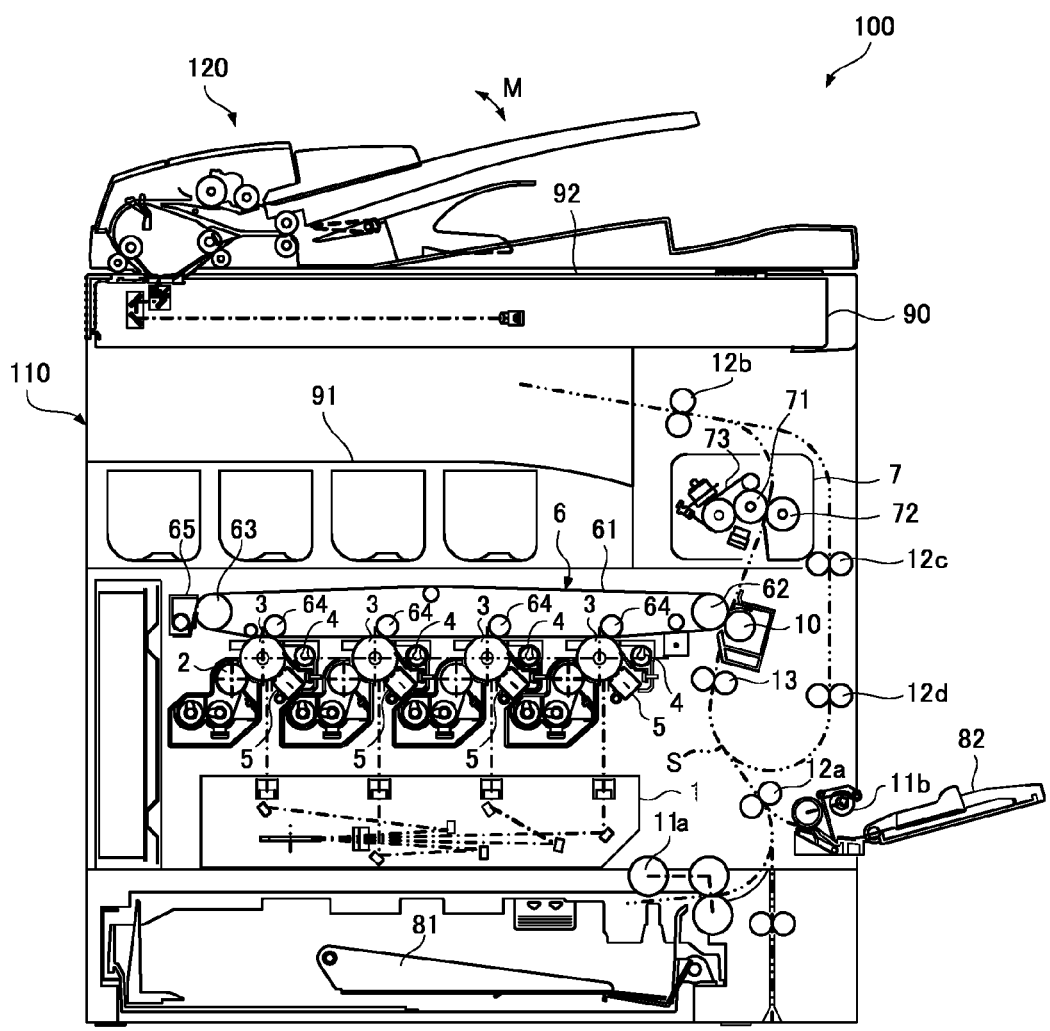
FIG. 1 is a cross-sectional view showing a schematic structure of an image forming apparatus provided with the image reading apparatus in accordance with an embodiment of the present invention.

In the following embodiments, the same components are denoted by the same reference characters. Their names and functions are also the same. Therefore, detailed description thereof will not be repeated.

Referring to FIG. 1, an image forming apparatus 100 provided with image reading apparatus 90 in accordance with the present embodiment forms a multi-colored or monochrome image on a prescribed sheet of recording paper, in accordance with image data formed by reading a document. Image forming apparatus 100 consists of an apparatus main body 110 and an automatic document feeder 120. The main body 110 includes an image reading apparatus 90, an optical scanning device 1, a developer 2, a photoreceptor drum 3, a cleaner unit 4, a charger 5, an intermediate transfer belt unit 6, a fixing unit 7, a paper feed cassette 81, and a paper discharge tray 91. In addition to these components, image forming apparatus 100 further includes components necessary for realizing the functions of the image forming apparatus.

Image reading apparatus 90 is arranged at an upper portion of apparatus main body 110. At an upper portion of image reading apparatus 90, a platen 92 formed of a transparent glass (platen glass) for placing a document is arranged. An automatic document feeder 120 is attached above platen 92. Automatic document feeder 120 automatically feeds and places a document on platen 92. Automatic document feeder 120 is formed to be rotatable in the direction of an arrow M, so that when opened, one can manually place the document on platen 92.

The image data handled in the present image forming apparatus 100 are color image data using colors of black (K), cyan (C), magenta (M) and yellow (Y), that is, image data separated to components of these four colors. Therefore, in order to form four different latent images of respective colors, four developers 2, four photoreceptor drums 3, four chargers 5 and four cleaner units 4 are provided. These components form four image stations for processing black, cyan, magenta and yellow, respectively.

Charger 5 is a device for uniformly charging the surface of photoreceptor drum 3 to a prescribed potential. Other than the charger type device shown in FIG. 1, a contact roller type, or a brush type charger may be used.

Optical scanning device 1 is a laser scanning unit (LSU) including a laser emitting unit and a reflection mirror. In optical scanning device 1, a polygon mirror for laser beam scanning and an optical element including a lens and a mirror for guiding the laser beam reflected by the polygon mirror to photoreceptor drum 3 are arranged. Other than such a configuration, a configuration having an EL or LED write head having light emitting elements arranged in an array, may be used as optical scanning device 1.

Optical scanning device 1 exposes the charged photoreceptor drum 3 in accordance with the input image data, and thereby forms an electrostatic latent image in accordance with the image data on the surface of photoreceptor drum 3. Developer 2 turns the electrostatic latent images formed on respective photoreceptor drums 3 to visible images with toners of four colors (YMCK), respectively. Cleaner unit 4 removes and recovers the toner left on the surface of each photoreceptor drum 3, after development and image transfer.

Intermediate transfer belt unit 6 arranged above photoreceptor drum 3 includes an intermediate transfer belt 61, an intermediate transfer belt driving roller 62, an intermediate transfer belt driven roller 63, an intermediate transfer roller 64 and an intermediate transfer belt cleaning unit 65. There are four intermediate transfer rollers 64, corresponding to respective colors of Y, M, C and K.

Around intermediate transfer belt driving roller 62, intermediate transfer belt driven roller 63, and intermediate transfer roller 64, intermediate transfer belt 61 is wound and driven to rotate. Each intermediate transfer roller 64 supplies transfer bias, which will be described later, for transferring the toner image on the corresponding photoreceptor drum 3 to intermediate transfer belt 61.

Intermediate transfer belt 61 is provided to be in contact with each photoreceptor drum 3. By successively transferring the toner images of respective colors formed on photoreceptor drums 3 onto intermediate transfer belt 61 to be superposed on the last, a color toner image (multi-color toner image) is formed on intermediate transfer belt 61. Intermediate transfer belt 61 is formed as an endless belt, using a film having the thickness of about 100 μm to 150 μm.

Transfer of the toner image from photoreceptor drum 3 to intermediate transfer belt 61 is done by intermediate transfer roller 64 that is in contact with the back side of intermediate transfer belt 61. A high voltage transfer bias (high voltage of a polarity (+) opposite to the charged polarity (−) of the toner) is applied to intermediate transfer roller 64, in order to transfer the toner image. Intermediate transfer roller 64 has a metal shaft (for example, of stainless steel) of 8 to 10 mm in diameter as a base, with its surface covered by a conductive elastic member (such as EPDM or urethane foam). Because of this conductive elastic member, uniform high voltage can be applied to intermediate transfer belt 61. Though a roller-shaped transfer electrode is used in the present embodiment, a brush or the like may be used as an alternative.

The electrostatic images turned to visual images in accordance with the hue on respective photoreceptor drums 3 as described above are superposed on intermediate transfer belt 61. Information of the thus superposed images (density distribution of toner) is transferred to a sheet of recording paper, as intermediate transfer belt 61 is rotated, by a transfer roller 10 arranged at the position of contact between the intermediate transfer belt 61 and the sheet of recording paper.

At this time, intermediate transfer belt 61 and transfer roller 10 are brought into pressure-contact with a prescribed nip, and a voltage (high voltage of a polarity (+) opposite to the charged polarity (−) of the toner) for transferring the toner to the sheet of recording paper is applied to transfer roller 10. Further, in order to constantly secure the nip mentioned above, a hard material (metal or the like) is used for one of the transfer roller 10 and intermediate transfer belt driving roller 62, and a soft material such as soft roller (elastic rubber roller, foam resin roller or the like) is used for the other one.

Further, as described above, the toner adhering to intermediate transfer belt 61 by the contact with photoreceptor drum 3, or toner not transferred to the sheet of recording paper by transfer roller 10 but left on intermediate transfer belt 61 may cause undesirable mixture of toner colors in subsequent process steps. Therefore, the toner adhering to intermediate transfer belt 61 and the toner left on intermediate transfer belt 61 are removed and recovered by intermediate transfer belt cleaning unit 65. In intermediate transfer belt cleaning unit 65, a cleaning blade that is brought into contact with intermediate transfer belt 61 is provided as a cleaning member. Intermediate transfer belt 61 is supported by intermediate transfer belt driven roller 63 at a portion where the cleaning blade contacts.

Paper feed cassette 81 is a tray for storing sheets of recording paper to be used for image formation, and provided below optical scanning device 1 in main body 110. Sheets of recording paper may also be placed on a manual feed cassette 82. A paper discharge tray 91 provided on main body 110 is for collecting the printed sheets of paper in face-down manner, that is, with the printed surface facing downward.

In main body 110, a paper feeding path S is formed in a substantially vertical direction, for feeding sheets of recording paper in paper feed cassette 81 or manual feed cassette 82 to paper discharge tray 91 through transfer roller 10 and fixing unit 7. In the vicinity of paper feeding path S from paper feed cassette 81 or manual feed cassette 82 to paper discharge tray 91, pick-up rollers 11*a* and 11*b*, a plurality of conveyor roller pairs 12*a* to 12*d*, a registration roller pair 13, a transfer roller 10, fixing unit 7 and the like are arranged.

Conveyor roller pairs 12*a* to 12*d* are small rollers for promoting and assisting feeding of the recording paper, and a plurality of conveyor roller pairs are provided along paper feeding path S. Pick-up roller 11*a* is arranged near one end of paper feed cassette 81, picks up sheets of recording paper one by one from paper feed cassette 81 and supplies the sheets to paper feeding path S. Similarly, pick-up roller 11*b* is arranged near one end of manual feed cassette 82, picks up sheets of recording paper one by one from manual feed cassette 82 and supplies the sheets to paper feeding path S.

Registration roller pair 13 temporarily holds the sheet of recording paper fed along paper feeding path S. Then registration roller pair 13 feeds the sheet of recording paper to transfer roller 10 at such timing when the leading edge of toner image on photoreceptor drum 3 is aligned with the leading edge of the sheet of recording paper.

Fixing unit 7 includes a heat roller 71 and a pressure roller 72. Heat roller 71 and pressure roller 72 rotate, with the sheet of recording paper pinched therebetween. Heat roller 71 is set to a prescribed fixing temperature by a control unit, based on a signal from a temperature detector (not shown). Heat roller 71 presses with heat, together with pressure roller 72, the toner to the sheet of recording paper, and thus, it has a function of melting, mixing and causing pressure-contact of multi-color toner image that has been transferred to the sheet of recording paper and thereby heat-fixing the image on the sheet of recording paper. Further, an external heating belt 73 for heating heat roller 71 from outside is provided.

The path for feeding the sheet of recording paper will be described. In image forming apparatus 100, paper feed cassette 81 and manual feed cassette 82 for storing sheets of recording paper in advance are provided, as mentioned above. In order to feed sheets of paper from these paper cassettes 81 and 82, pick-up rollers 11*a* and 11*b* are arranged, respectively, to guide the sheets of recording paper one by one to paper feeding path S.

A sheet of recording paper coming from paper feed cassette 81 or 82 is conveyed to registration roller pair 13 by conveyor roller pair 12*a* along paper feeding path S, fed to transfer roller 10 at the timing when the leading edge of the sheet and the leading edge of image information are aligned, and thus, image information is written on the sheet of recording paper. Thereafter, not-yet fixed toner on the sheet of recording paper is melted and fixed as the sheet passes through fixing unit 7, and through conveyor roller pair 12*b* arranged at the end of paper feeding path S, the sheet is discharged to discharge tray 91.

The feeding path described above corresponds to a request for printing on one side of the sheet of recording paper. If double-sided printing is requested, when the rear end of the sheet that has passed the fixing unit 7 is held by the conveyor roller pair 12*b* at the end of the feeding path, the conveyor roller pair 12*b* rotates in reverse direction. Thus, the sheet of recording paper is fed to conveyor roller pairs 12*c* and 12*d*. Thereafter, the sheet of recording paper is fed to registration roller pair 13, printing is done on the back side of the sheet in the same manner as described above, and then the sheet is discharged to paper discharge tray 91.

Figure 2:
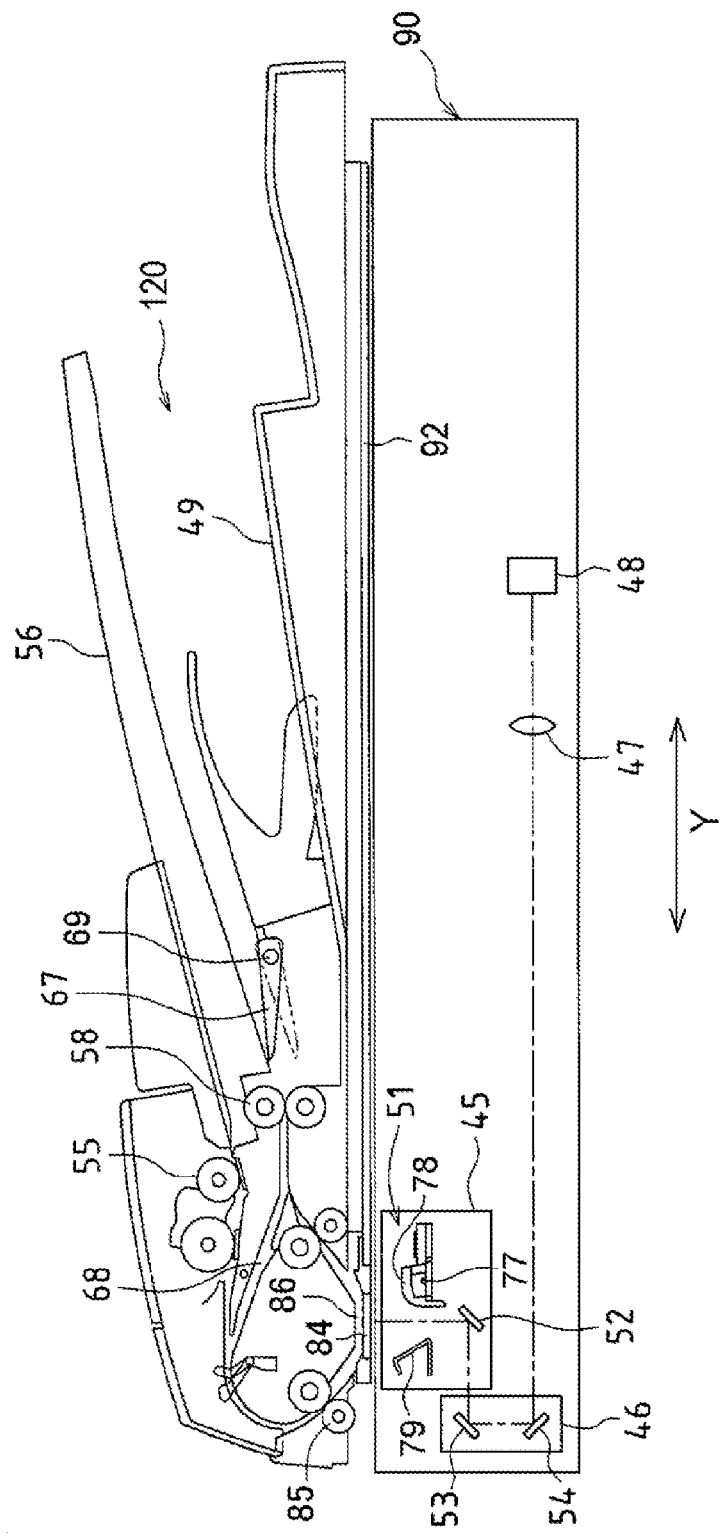
FIG. 2 is a cross-sectional view showing a schematic structure of the image reading apparatus in accordance with an embodiment of the present invention.

Image reading apparatus 90 and automatic document feeder 120 will be described. Referring to FIG. 2, automatic document feeder 120 has a deep side pivotally supported by means of a hinge (not shown) on a deep side of image reading apparatus 90. By moving upward/downward the front portion of automatic document feeder 120, platen (platen glass) 92 of image reading apparatus 90 is exposed, and a document can be placed on platen 92.

Image reading apparatus 90 includes platen 92, a first scanning unit 45, a second scanning unit 46, an image forming lens 47, and a CCD 48.

The first scanning unit 45 includes an illumination device 51 and a first reflection mirror 52. The first scanning unit 45 moves at a constant velocity V to a sub-scanning direction Y by a distance corresponding to the document size, while exposing the document on platen 92 using illumination device 51. The reflected light is reflected by the first reflection mirror 52 and directed to the second scanning unit 46. In this manner, an image (including color or black-and-white characters, a figure, a photograph or the like) on the surface of the document is scanned in the sub-scanning direction Y. The second scanning unit 46 includes a second reflection mirror 53 and a third reflection mirror 54. The second scanning unit 46 moves at a velocity V/2 following the first scanning unit 45, and reflects the light reflected from the document by the second and third reflection mirrors 53 and 54 to image forming lens 47. Image forming lens 47 collects the light reflected from the document to CCD 48, and forms an image of the document surface on CCD 48. CCD 48 scans the document image repeatedly in the main scanning direction (the direction vertical to the surface of FIG. 2), and at every scanning, outputs analog image signals of one main scanning line.

The first and second scanning units 45 and 46 have pulleys (not shown), respectively. A wire (not shown) is wound around these pulleys, and as the wire is driven by a stepping motor, the first and second scanning units 45 and 46 move in a synchronized manner.

Image reading apparatus 90 can read not only the stationary document on platen 92 but also images on the surface of a document fed by automatic document feeder 120. In that case, the first scanning unit 45 is moved to a reading area below document reading glass 84 as shown in FIG. 2, and the second scanning unit 46 is arranged corresponding to the position of the first scanning unit 45. In this state, feeding of document by automatic document feeder 120 starts.

In automatic document feeder 120, a pick-up roller 55 is rotated with the roller pressed on a document on document tray 56, to draw a sheet of document, and the document is conveyed. The leading edge of the document is fed to abut a registration roller pair 85, so as to be aligned. Thereafter, the document is passed through document reading glass 84 and a reading guide plate 86, and discharged through a discharge roller pair 58 to a discharge tray 49.

When the document is fed, illumination device 51 of the first scanning unit 45 illuminates the document surface through document reading glass 84. The light reflected from the document surface is guided by the reflection mirrors of the first and second scanning units 45 and 46 to image forming lens 47, collected by image forming lens 47 to CCD 48, and the image on the document surface is formed on CCD 48. In this manner, the image on the document surface is read.

When the back side of the document is to be read, an intermediate tray 67 is rotated about its shaft 69 as represented by a chain-dotted line. In this state, while the document is discharged from discharge roller pair 58 to discharge tray 49, discharge roller pair 58 is stopped, and the document is received by intermediate tray 67. In this state, discharge roller pair 58 is rotated in reverse direction, so that the document is guided through a reverse feeding path 68 to registration roller pair 85, and the document is turned over. In the similar manner as reading the image on the front side, the image on the back side of the document is read. Thereafter, the intermediate tray 67 is returned to the original position represented by the solid line, and the document is discharged through discharge roller pair 58 to discharge tray 49.

The image on the document surface read by CCD 48 in this manner is output as an analog image signal from CCD 48. The analog image signal is subjected to A/D conversion, and a digital image signal is generated. The digital image signal is subjected to various image processing operations and thereafter input to optical scanning device (laser exposure device) 1 of image forming apparatus 100, in which the image is recorded on a sheet of recording paper and the sheet is output as a copied document.

When a document on platen 92 or document reading glass 84 is to be irradiated by illumination device 51 of first scanning unit 45, it is desired to reduce loss of emitted light so that substantially the light emitted from LED array 77 is fully incident on the document. For this purpose, illumination device 51 shown in FIG. 2 has a light guiding member 78 and a reflector 79. Light guiding member 78 directly guides the light emitted from LED array 77 toward the document, and guides light, reflected in a direction that cannot directly irradiate the document, to reflector 79. Reflector 79 reflects the light that has been guided by light guiding member 78 toward the document. Thus, the loss of light emitted from LED array 77 can be reduced, and the emitted light can almost fully be directed to the document.

Figure 3:
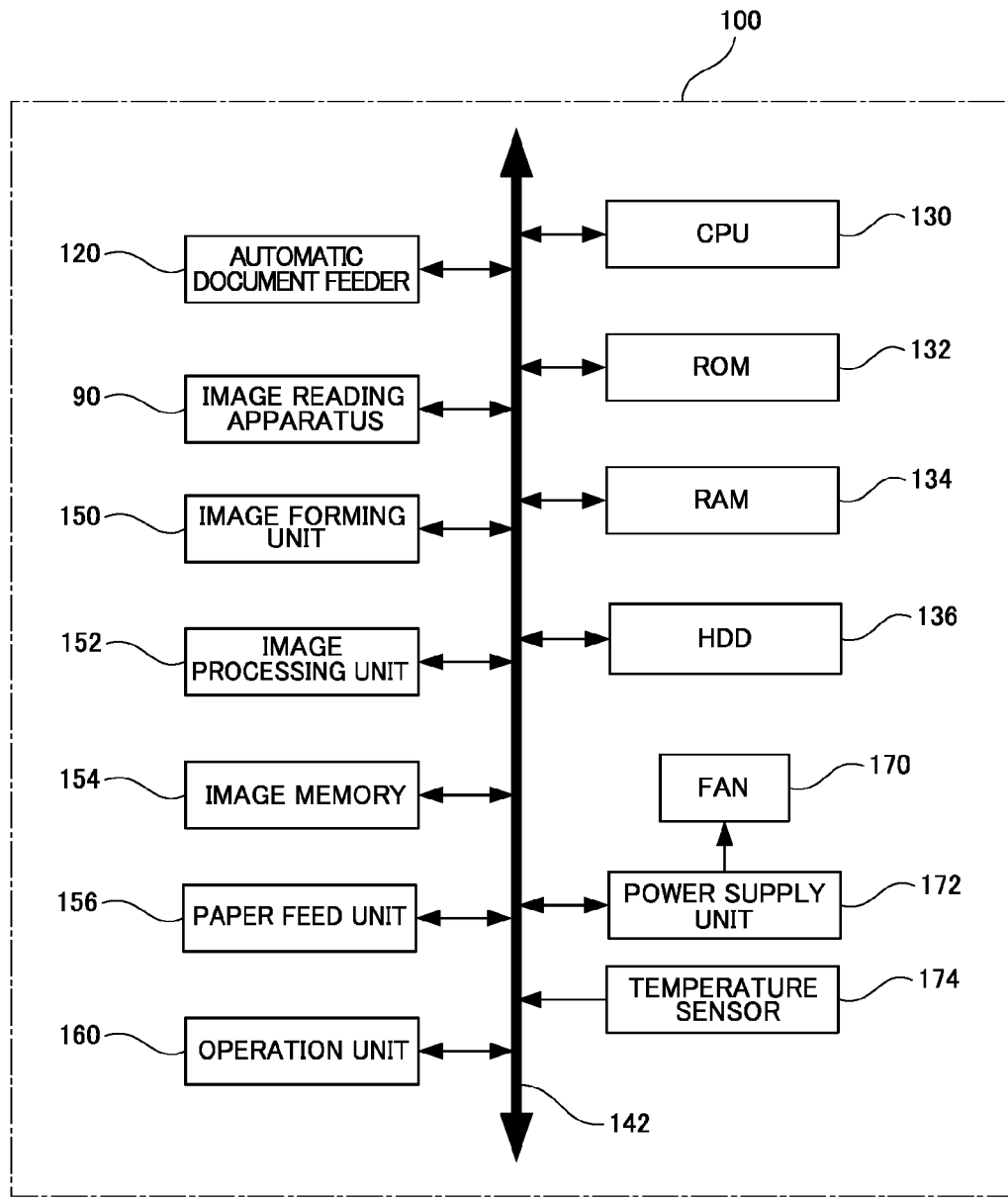
FIG. 3 is a block diagram showing a schematic configuration of the image forming apparatus shown in FIG. 1.

Referring to FIG. 3, image forming apparatus 100 includes: a control unit (hereinafter referred to as a CPU (Central Processing Unit)) 130 for overall control of image forming apparatus 100; an ROM (Read Only Memory) 132; an RAM (Random Access Memory) 134; an HDD (Hard Disk Drive) 136; and a bus 142. ROM 132 is a non-volatile storage device that retains data even when power is turned off. ROM 132 stores programs and data necessary for controlling operations of image forming apparatus 100. RAM 134 is a volatile storage device. HDD 136 is a non-volatile storage device.

CPU 130, ROM 132, RAM 134 and HDD 136 are connected to bus 142. Data (including control information) is exchanged between each of these components through bus 142. CPU 130 reads a program from ROM 132 to RAM 134 through bus 142, and executes the program, using a part of RAM 134 as a work area. Specifically, CPU 130 controls various units and components forming image forming apparatus 100 in accordance with the program stored in ROM 132, and realizes various functions of image forming apparatus 100.

Image forming apparatus 100 further includes a power supply unit 172 for supplying electric power to a fan 170, a temperature sensor 174, automatic document feeder 120, image reading apparatus 90, image forming unit 150, image processing unit 152, image memory 154, paper feed unit 156, and an operation unit 160. These are also connected to bus 142.

Operation unit 160 receives inputs such as an instruction by the user to first image forming apparatus 100. Operation unit 160 includes an operation panel and an operation key portion (both not shown). The operation panel includes a display panel formed, for example, by a liquid crystal panel, and a touch-panel arranged on the display panel, allowing detection of a touched position. In order to operate image forming apparatus 100, soft keys are displayed on the display panel, and on the operation key portion, hard keys are arranged. CPU 130 monitors user operation of these keys. The user can input an instruction of image formation, setting of conditions for image formation and the like to image forming apparatus, by pressing or touching these keys. Selection of a key displayed on the display panel is done by touching the corresponding portion of the touch-panel superposed on the display panel.

When the user operates operation unit 160 and instructs image formation, document is read by image reading apparatus 90 and image data is generated, as described above, and the image data is temporarily stored in image memory 154. Image processing unit 152 executes various image processing operations on the image data stored in image memory 154. The image data is stored in HDD 136 as needed.

Paper feed unit 156 includes paper feed cassettes 81 and 82 mentioned above, and holds sheets of recording paper for image formation. Image forming unit 150 includes photoreceptor drum 3, charger 5, optical scanning device 1, developer 2, transfer roller 10 and fixing unit 7, as mentioned above. Image forming unit 150 forms image data read from image memory 154 or from HDD 136 on a sheet of recording paper fed from paper feed unit 156, as described above.

Figure 4:
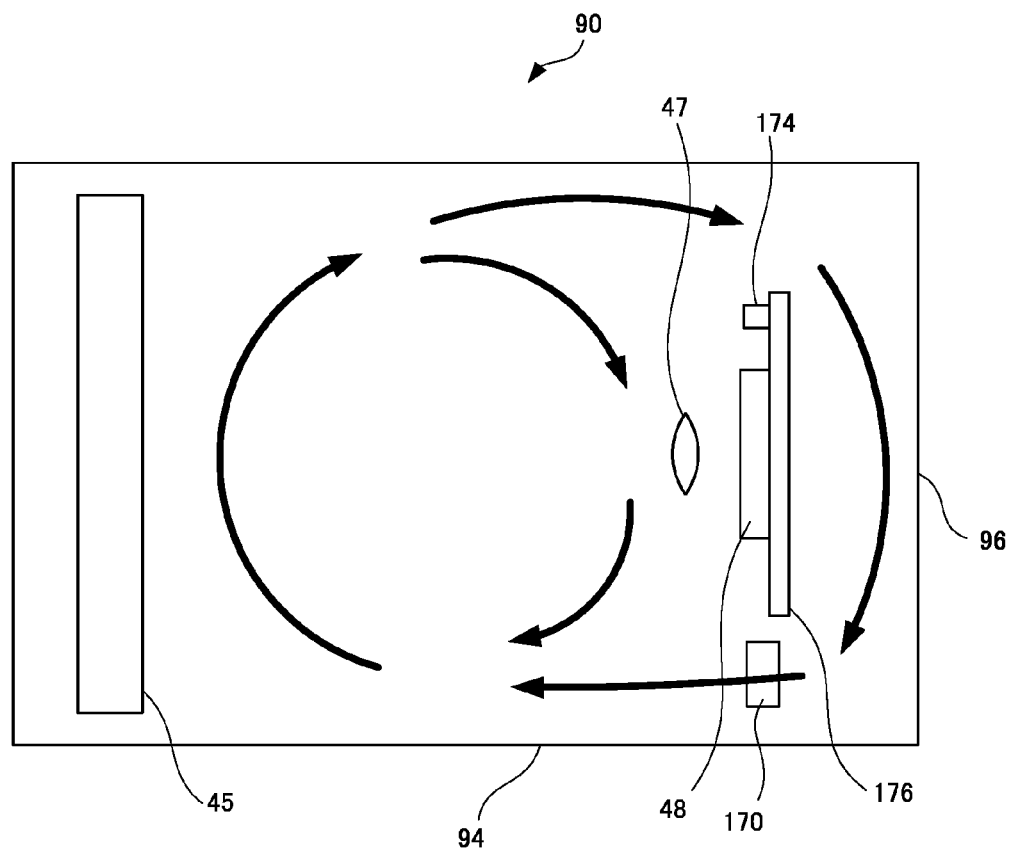
FIG. 4 is a plan view showing a schematic configuration of the image reading apparatus shown in FIG. 2.

Fan 170 is arranged near a CCD substrate 176 on which CCD 48 is mounted, as shown in FIG. 4. In FIG. 4, fan 170 is arranged between an end portion in the longitudinal direction of CCD substrate 176 and a frame sidewall 94 of image reading apparatus, and blows air from the right side to the left side.

Temperature sensor 174 is arranged on CCD substrate 176, and detects the temperature of CCD substrate 176.

Assuming that fan 170 and temperature sensor 174 are arranged in image reading apparatus 90 as shown in FIG. 4, the function of controlling the operation of fan 170 in image reading apparatus 90 at the time of operation of image forming apparatus will be described.

Figure 5:
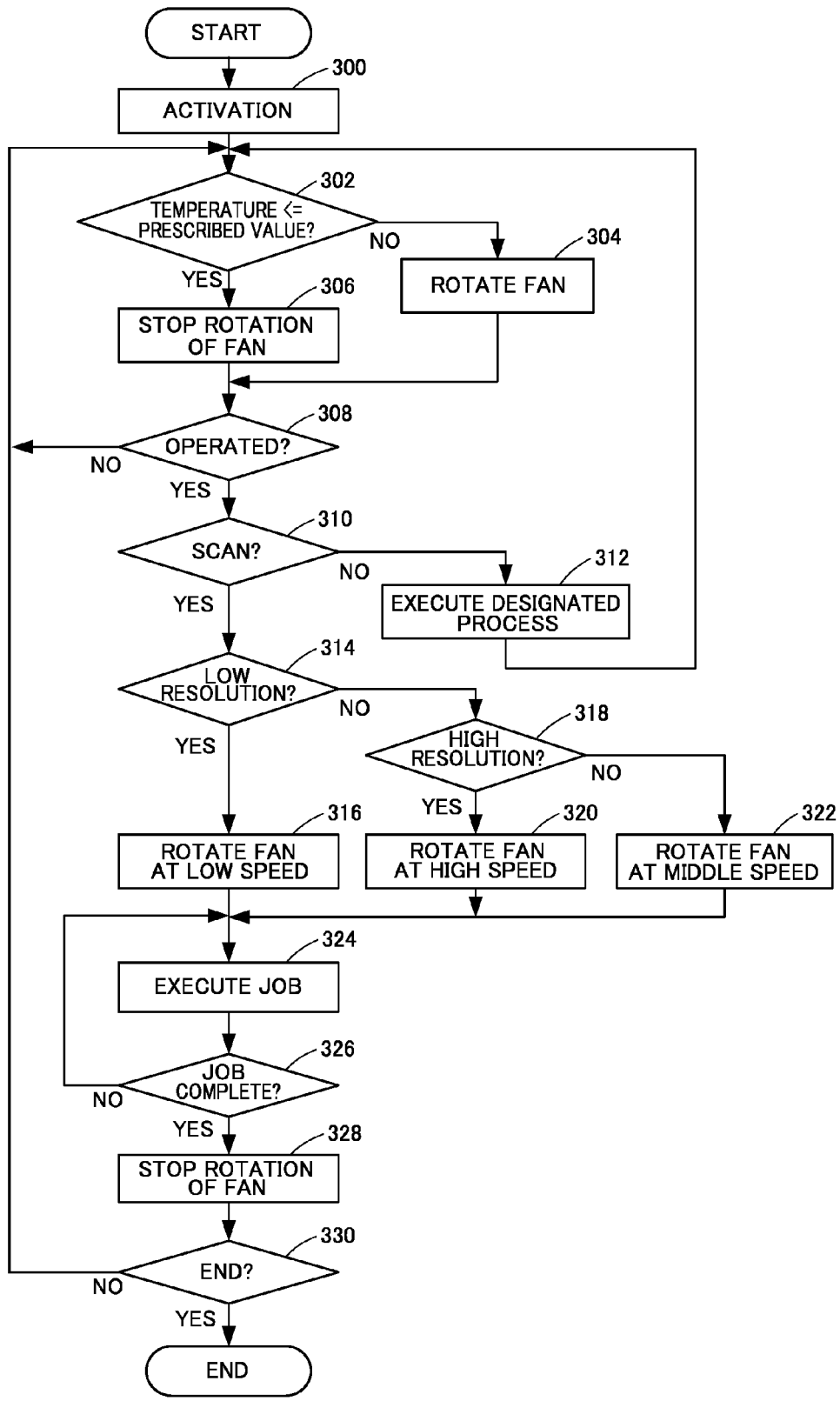
FIG. 5 is a flowchart representing a control structure of a program controlling a fan in the image reading apparatus shown in FIG. 2.

Referring to FIG. 5, at a step 300 of the program controlling the operation of fan 170, image forming apparatus 100 is powered on and warmed-up. At this time, CPU 130 reads a prescribed program from ROM 132 and displays a screen image including a prescribed key or keys on the operation panel of operation unit 160, and waits for an operation by the user.

At step 302, CPU 130 detects temperature of CCD substrate 176 using temperature sensor 174, and determines whether or not the detected temperature is at a prescribed temperature or lower. If the detected temperature is equal to or lower than the prescribed temperature, the control proceeds to step 306. Otherwise, the control proceeds to step 304. The prescribed temperature is, for example, 60° C. In the present specification, the temperature is not the value actually measured by temperature sensor 174 but "35° C. equivalent temperature." The 35° C. equivalent temperature is calculated from the actually measured value and the room temperature (temperature of the site where image reading apparatus 90 is installed), as 35° C. equivalent temperature=35° C.−room temperature+actually measured temperature.

At step 304, CPU 130 controls power supply unit 172 such that a prescribed voltage is supplied to fan 170 to rotate fan 170. If fan 170 is already rotating, the state is maintained. The supplied voltage is, for example, rated voltage of fan 170. Then, the control proceeds to step 308.

At step 306, CPU 130 controls power supply unit 172 such that the power supply to fan 170 is stopped, to stop fan 170. If fan 170 is not rotating, the state is maintained.

At step 308, CPU 130 determines whether or not the user has operated operation unit 160 and any instruction has been input. If it is determined that an operation has been done, the control proceeds to step 310. Otherwise, the control returns to step 302.

At step 310, determination is made as to whether the instruction at step 308 is an instruction to operate image reading apparatus 90, that is, an instruction to execute a job involving scanning. An instruction to execute a job involving scanning is, for example, an instruction to copy a document. If it is an instruction to execute a job involving scanning, the control proceeds to step 314. Otherwise, the control proceeds to step 312.

At step 312, CPU 130 executes the instructed process. By way of example, if an operation to set copy conditions (for example, selection of black-and-white/color, number of copies, copy density, scanning resolution and the like) is received before executing the copying operation, corresponding process or processes are executed.

At step 314, CPU 130 determines whether or not the scanning resolution is low. Here, it is assumed that in image forming apparatus 100, a plurality of scanning resolutions can be set and specifically, the resolution is classified to three types, that is, low resolution (for example, 300 DPI or lower), middle resolution (for example, 300 DPI<middle resolution<600 DPI) and high resolution (for example, 600 DPI or higher). If it is determined to be the low resolution, the control proceeds to step 316. Otherwise, the control proceeds to step 318.

At step 316, CPU 130 controls power supply unit 172 such that fan 170 is rotated at a low speed. Here, the number of rotations of fan 170 depends on the supplied voltage. A low voltage is supplied from power supply unit 172 to fan 170. Thereafter, the control proceeds to step 324.

At step 318, CPU 130 determines whether or not the scanning resolution is the high resolution. If it is determined to be the high resolution, the control proceeds to step 320. Otherwise, the control proceeds to step 322.

At step 320, CPU 130 controls power supply unit 172 such that fan 170 is rotated at high speed. A high voltage is supplied from power supply unit 172 to fan 170. Thereafter, the control proceeds to step 324.

At step 322, CPU 130 controls power supply unit 172 such that fan 170 is rotated at a middle speed. A middle level voltage is supplied from power supply unit 172 to fan 170. Thereafter, the control proceeds to step 324.

At step 324, CPU 130 executes the designated job. Specifically, CPU 130 controls image reading apparatus 90 such that the document on platen 92 is scanned and the image data is temporarily stored in image memory 154. If a document is set on automatic document feeder 120, CPU 130 controls automatic document feeder 120 such that the document is fed to platen 92, and then it controls image reading apparatus 90 such that the document is scanned. At this time, fan 170 rotates at the speed in accordance with the voltage supplied at step 316, 318 or 320. The temporarily stored image data is processed in accordance with the designated job.

At step 326, CPU 130 determines whether or not the job has been completed. If it is determined that the job is completed, the control proceeds to step 328. Otherwise, the control returns to step 324, and scanning is repeated. Thus, fan 170 is kept rotating.

At step 328, CPU 130 stops voltage supply from power supply unit 172, and stops rotation of fan 170.

At step 330, CPU 130 determines whether or not an end instruction has been received. If it is determined that an end instruction has been received, the program ends. Otherwise, the control returns to step 302. The end instruction is, for example, power off of image forming apparatus 100.

In the manner as described above, when image reading apparatus 90 operates and the temperature of CCD substrate 176 becomes higher than the prescribed value because of the heat generated by the light source (LED array 77), fan 170 can be rotated. Thus, as represented by arrows in FIG. 4, the air in image reading apparatus 90 can be circulated. Specifically, fan 170 sucks air in the space behind CCD substrate 176 (back side of the surface on which CCD 48 is mounted), and discharges the air to the side of first scanning unit 45. The air discharged from fan 170 is reversed mainly at the front surface (the surface opposite to CCD 48) of first scanning unit 45, and flows to image forming lens 47 and the back side of CCD substrate 176. Therefore, efficient heat radiation through the sidewall of a frame of image reading apparatus 90 becomes possible, and the temperature inside image reading apparatus 90, especially the temperature of CCD 48 can be prevented from attaining too high. Any special opening communicated to the outside is not formed in the frame of image reading apparatus 90 and, therefore, dust-proof property is not degraded.

Particularly, as the speed of rotation of fan 170 is controlled in accordance with the resolution of scanning at steps 314 to 322, power consumption by fan 170 can be properly adjusted. For scanning at high resolution, the light source is kept on for a long period and much heat is generated. Therefore, in order to prevent CCD 48 from being heated to a high temperature, it is desirable to rotate fan 170 at a high speed. On the other hand, for scanning at low resolution, the light source is kept on only for a short period and not much heat is generated. Therefore, by rotating fan 170 at a low speed, unnecessary power consumption can be avoided.

Though not shown in FIG. 4, there may be a cover arranged to partially cover CCD substrate 176. In that case, the shape of cover should preferably be designed not to block air flow from fan 170 and to form air flow near CCD substrate 176.

Though an example in which temperature sensor 174 is provided on CCD substrate 176 has been described above, arrangement of the temperature sensor is not limited to the above. The temperature sensor may be arranged at an arbitrary position, provided that the temperature of CCD 48 can be evaluated. It may be arranged to enable direct measurement of CCD 48. It is also possible to arrange the temperature sensor near the light source for scanning (LED array 77), to determine whether or not its temperature is equal to or lower than a prescribed temperature, and the fan may be rotated if the temperature exceeds the prescribed temperature. It is also possible to arrange temperature sensors near CCD substrate 176 and near the light source (for example, first scanning unit 45), respectively, and whether or not the detected temperatures are equal to or lower than a prescribed temperature may be determined. The sensor may be arranged to enable direct measurement of the light source.

The arrangement of fan 170 is not limited to the position shown in FIG. 4. Fan 170 may be arranged at any position, provided that it is out of the movable range of first scanning unit 45 and that circulation of air in image reading apparatus 90 can be attained (more preferably, air circulation along the sidewall of the frame of image reading apparatus 90 can be attained). For instance, in FIG. 4, the fan may be arranged on the side where temperature sensor 174 is arranged. The fan may be arranged between the back surface of CCD substrate 176 and sidewall 96 of the frame. In that case, the direction of blowing may be determined such that the air flows along the back surface of CCD substrate 176. If prescribed amount of air flow cannot be attained by one fan, two or more fans may be provided.

When controlling the number of rotations of the fan in accordance with the scanning resolution, the classification to three types mentioned above is not limiting. What is necessary is classification to at least two types, and classification to four or more types to control the number of rotations of the fan is also possible.

Though an example in which the speed of rotation of the fan is controlled in accordance with scanning resolution has been described in the foregoing, the fan can be rotated in intermittent manner, linked to on/off of the light source. By way of example, the fan may be rotated while the light source is on (light emitting state), and the rotation of the fan may be stopped if the light source is off (light-off state). This can further reduce wasteful power consumption.

If a plurality of documents are set at automatic document feeder 120 and scanning is to be executed as one job, scanning is executed while the first scanning unit 45 is fixed at the position shown in FIG. 2 (reading area below document reading glass 84). If the number of documents is small and scanning ends in a short time period, it is unnecessary to rotate the fun. If a large number of documents are to be scanned, however, the light source is heated to a high temperature. Therefore, it is desirable to rotate the fan. Therefore, it is preferred to rotate the fun if a prescribed time period has passed from when the documents are set to automatic document feeder and scanning is started (emission of light from the light source started). By appropriately setting the prescribed time period, it is possible to prevent CCD 48 from attaining high temperature, even without using any temperature sensor.

In order to prevent any influence of vibration caused by the fan on the optical system (image forming lens 47 and the like) and on CCD 48, it is preferred to arrange an elastic member (for example, rubber) to absorb vibration of fan 170, between fan 170 and the bottom surface of image reading apparatus 90.

In the foregoing, copy function (printing on a sheet of recording paper) of the image forming apparatus has been mainly described. The image forming apparatus, however, may be a multifunctional peripheral having functions other than the copying function. Specifically, the present invention is also applicable to an image reading apparatus mounted on a multifunctional peripheral having the functions of transmitting image data obtained by scanning by FAX, transmitting the image data by attaching it to an e-mail, transferring the image data to a computer such as a server and the like.

Figure 6:
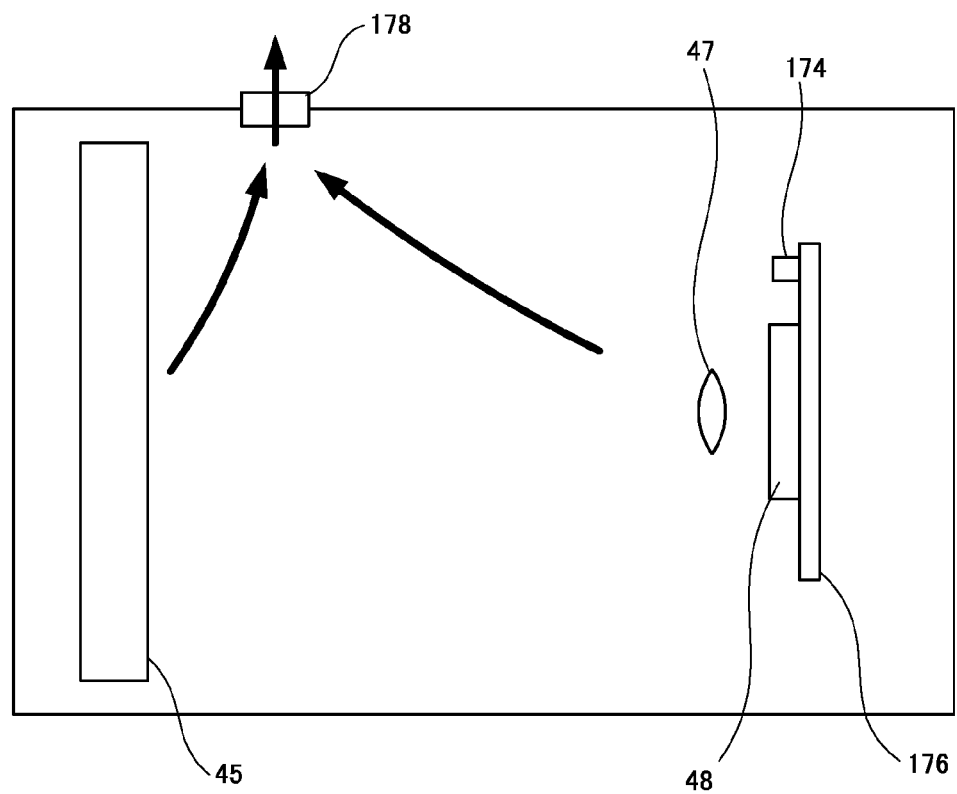
FIG. 6 is a plan view showing a state in which the fan is provided on a sidewall of the image reading apparatus.

Results of experiments shown below indicate effectiveness of the present invention. A fan was arranged as shown in FIG. 4, and the temperatures of CCD and LED light source were measured while circulating air in the image reading apparatus. As a comparative example, a fan 178 was attached to a side wall of image reading apparatus 90 as shown in FIG. 6, and the temperatures of CCD and LED light source were measured while discharging the air of image reading apparatus 90.

In both examples, an image forming apparatus having a DSPF (Duplex Single Pass Feeder) was used as automatic document feeder 120, and the experiment was done in duplex copying mode, in which much heat is generated from the LED light source and the CCD. Specifically, copying operation was executed for about 2 hours, with scanning speed of 372 mm/sec, which corresponds to scanning resolution of 400 DPI, and paper feeding rate through DSPF of 75 sheets/min.

As the fan, a small DC fan manufactured by NMB Technologies Corporation (part number: 1608KL-05W-B59-L00) was used. Specification of the fan was as follows: rated voltage 24V; power 1.92 W; size 40 mm (length)×40 mm (height) (air blowing surface), 20 mm (depth) (blowing direction); air flow rate 9.5 cubic feet/min (0.27 $m^3$/min). When the fan was arranged as shown in FIG. 4, a voltage of 12V was continuously supplied to the fan, from the start of copying. When the fan was arranged as shown in FIG. 6, a voltage of 24V was continuously supplied to the fan, from the start of copying.

The results are as shown in Table 1. In Table 1, Measurement Condition A corresponds to the fan arrangement of FIG. 4, and Measurement Condition B corresponds to the fan arrangement of FIG. 6. The temperatures are all 35° C. equivalent temperature. Ambient temperature was both 25° C. (actually measured value).

| Place of Measurement | Measured Temperature | |
| --- | --- | --- |
|  | Measurement Condition A | Measurement Condition B |
| Center of LED substrate | 84.5 | 85.7 |
| Surface of CCD substrate | 60.3 | 65 |
| Center of frame bottom surface | 51.9 | 51.3 |

As can be seen from Table 1, though the temperature of frame bottom surface representing the atmosphere in the image reading apparatus are substantially the same under Measurement Conditions A and B, the temperatures of CCD substrate and of LED substrate are both lower under Measurement Condition A. Therefore, it is understood that, in order to prevent temperature increase of CCD substrate and LED substrate, it is better to arrange the fan as shown in FIG. 4 to circulate air in the image forming apparatus, than to arrange the fan on the frame sidewall to discharge air to the outside. Further, considering that the speed of rotation of fan is lower (supplied voltage is lower) under Measurement Condition A than Measurement Condition B, it can be understood that the arrangement of FIG. 4 is very advantageous.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image reading apparatus, comprising:
   a light emitting unit emitting light;
   a light receiving unit receiving light reflected from a document irradiated with light from said light emitting unit;
   an air blower unit blowing out sucked air to one direction; and
   a housing unit housing said light emitting unit, said light receiving unit and said air blower unit; wherein
   said air blower unit circulates air in a space formed by said housing unit;
   said housing unit has a rectangular parallelepiped shape having an upper surface, a lower surface opposite to said upper surface and four side surfaces;
   said air blower unit is arranged between said light receiving unit and one of the side surfaces of said housing unit; and
   air blowing direction as a direction of discharging air having been sucked within said housing unit by said air blower unit, is a direction other than to said light receiving unit, and is along said side surface opposite to said light receiving unit with said air blower unit positioned in between.

2. The image reading apparatus according to claim 1, wherein said housing unit forms a substantially sealed space preventing entrance of air from the outside as said air blower unit blows air.

3. The image reading apparatus according to claim 1, wherein said air blower unit is arranged close to said light receiving unit.

4. The image reading apparatus according to claim 1, further comprising:
   a temperature detecting unit for detecting temperature of at least one of said light receiving unit and said light emitting unit; and
   said air blower unit blows air if a value detected by said temperature detecting unit is larger than a prescribed value, and stops air blow if the value detected by said temperature detecting unit is equal to or smaller than the prescribed value.

5. The image reading apparatus according to claim 1, wherein said air blower unit blows air if said light emitting unit is emitting light, and stops air blow if said light emitting unit is not emitting light.

6. The image reading apparatus according to claim 1, wherein said air blower unit increases air flow rate as resolution of scanning a document by said light receiving unit becomes higher.

7. The image reading apparatus according to claim 1, further comprising:
   a timer detecting passage of time; wherein
   said air blower unit starts blowing air if it is detected by said timer that a prescribed time has passed from start of light emission with said light emitting unit fixed in one job.

* * * * *